C. M. CLAY.
GASKET FOR HOSE COUPLINGS.
APPLICATION FILED APR. 17, 1907.
979,433.
Patented Dec. 27, 1910.
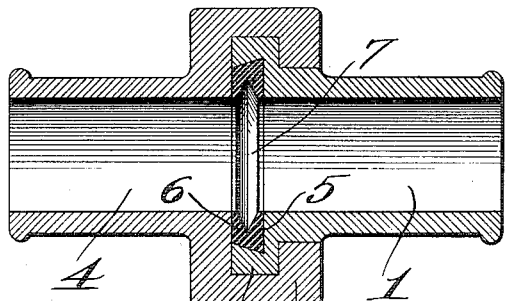
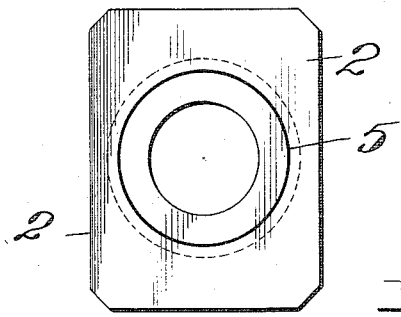
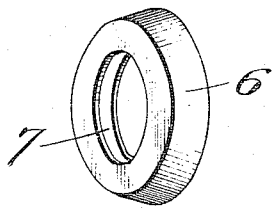
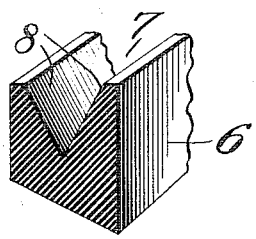
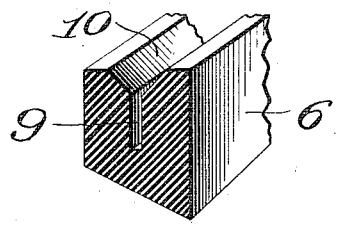
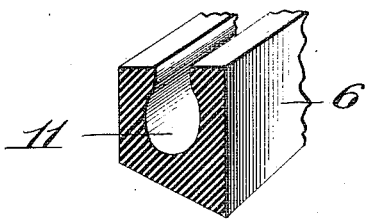
ATTEST.
H. J. Fletcher.
M. P. Smith
INVENTOR.
C. M. Clay
BY
Higdon & Longan ATT'YS

UNITED STATES PATENT OFFICE.

CASSIUS M. CLAY, OF MEXICO, MISSOURI.

GASKET FOR HOSE-COUPLINGS.

979,433.

Specification of Letters Patent.

Patented Dec. 27, 1910.

Application filed April 17, 1907. Serial No. 368,774.

*To all whom it may concern:*

Be it known that I, CASSIUS M. CLAY, a citizen of the United States, and resident of Mexico, Missouri, have invented certain new and useful Improvements in Gaskets for Hose-Couplings, of which the following is a specification containing a full, clear, and exact description, reference being had to the accompanying drawings, forming a part hereof.

My invention relates to a gasket for hose couplings, my object being to provide a simple, inexpensive, self-packing gasket, which is arranged between the meeting faces of the members of a hose coupling, and which gasket is so constructed as to be acted upon by the pressure of the fluid within the hose or pipe to cause said gasket to automatically pack the joint between the members of the coupling, and thus prevent the escape of the fluid pressure.

To the above purposes, my invention consists in certain novel features of construction and arrangement of parts, which will be hereinafter more fully set forth, pointed out in the claim, and illustrated in the accompanying drawings, in which:—

Figure 1 is a horizontal section of the interlocked members of a hose coupling, with my improved gasket in position between said members; Fig. 2 is a face view of the member of the hose coupling which carries the gasket; Fig. 3 is a perspective view of the gasket detached from the coupling; Fig. 4 is a detail view showing in cross section the preferred form of my improved gasket; Fig. 5 is a view similar to Fig. 4, and showing a modified form of the gasket; Fig. 6 is a view similar to Figs. 4 and 5, and showing a third modified form of the gasket.

Referring by numerals to the accompanying drawings:—1 designates the tubular body portion of one of the members of a hose coupling, which is provided at one end with the vertically disposed flanges 2, which are engaged by flanges 3 carried by the opposite member 4 of the coupling, and formed in the end of the member 1, which engages against the member 4 and around the opening through said member 1, is an annular undercut groove 5. Detachably positioned in this groove is a gasket 6, in the form of a ring, with its outer periphery beveled, so as to fit the corresponding surface of the undercut groove 5, and the internal diameter of the gasket being equal to the diameter of the opening through the tubular portions of the members 1, and 4.

The gasket is constructed of rubber, or analogous flexible, elastic material, and when positioned in the annular groove 5, the outer face of said gasket lies flush with the end face of the member 1.

Formed in the inner face of the gasket 6 is a continuous groove 7, preferably V-shape in cross section, thus forming a pair of oppositely inclined or beveled faces 8.

In some instances, the gasket may be formed with a slot, such as 9, extending outwardly from its inner face, the mouth of which slot is widened, as designated by 10; or said gasket may be provided with a groove, such as 11, the side walls of which may be either straight or curved.

A gasket of my improved construction is seated in the undercut groove 5; and, when so arranged, does not project beyond the face of the end of the member 1; and when the members of the coupling are united, there will be no wear upon the gasket, nor will there be any tendency to dislodge said gasket from its position, as is the case where the gasket projects slightly beyond the face of the member 1.

When the parts of the coupling are united, and fluid pressure is passing through the hose or pipes connected to the coupling, the normal pressure on the interior of the coupling is exerted against the faces 8 of the groove 7; and, as a result, the side edges of the gasket are tightly forced against the parts of the coupling, with which they normally contact, and a very tight joint is effected; and the leakage of fluid pressure through the coupling is reduced to a minimum. Thus, by forming a groove on the inner face of the gasket, said gasket is made self-packing when fluid pressure is conveyed through the hose or pipes; and said gasket is so positioned in one of the tubular members as to be free from wear.

The gaskets can be made in various sizes, as required, and are preferably constructed of rubber, which is treated so as to prevent its deterioration resulting from contact with water, or steam.

I claim:—

The combination with the tubular members of a hose coupling, one of which is provided with a flange and the other provided with a groove to receive said flange for locking said members together, and one of which members is provided in its flanged portion with an undercut groove, the walls of said groove being formed at an angle less than a right angle to each other, one of the walls terminating flush with the opening through said member and the other wall terminating away from said opening, of a gasket in the form of an elastic ring seated in said groove having its outside periphery formed at an acute angle relative to one of its faces and its opposite face parallel to said first mentioned face, the said gasket having formed on its inner periphery and centrally of the gasket a V-shaped groove, the inner edges of said groove terminating flush with the opening through the coupling, the walls of which when acted on by the expansive pressure of a fluid within the coupling will force said walls against the walls of the undercut groove in one member and against the opposing face of the opposite member.

In testimony whereof, I have signed my name to this specification, in presence of two subscribing witnesses.

CASSIUS M. CLAY.

Witnesses:
J. C. CLAY,
F. C. CLAY.